United States Patent [19]

Padgett

[11] Patent Number: 5,304,425
[45] Date of Patent: Apr. 19, 1994

[54] COMPOSITION AND METHOD FOR PRESERVING AND RESTORING DE-ICER SURFACES

[76] Inventor: Timothy A. Padgett, Rte. 1, Box 31-6A, Rhome, Tex. 76078

[21] Appl. No.: 853,898

[22] Filed: Mar. 19, 1992

Related U.S. Application Data

[63] Continuation-in-part of Ser. No. 711,617, Jun. 5, 1991, abandoned.

[51] Int. Cl.⁵ .............. B32B 9/04; C08K 5/05; C08J 3/00; C09K 3/18
[52] U.S. Cl. .................. 428/484; 524/95; 524/319; 524/386; 524/389; 524/501; 524/502; 524/506; 524/767; 428/521; 106/13; 252/70; 252/78.3
[58] Field of Search ............ 252/70, 78.3; 106/13; 524/386, 501, 379, 502, 388, 767, 389, 837, 157, 506, 166, 95, 319; 428/447, 484, 521

[56] References Cited

U.S. PATENT DOCUMENTS

| | | | |
|---|---|---|---|
| 2,898,233 | 7/1958 | Hmiel | 524/386 |
| 2,937,098 | 5/1960 | Geen | 524/157 |
| 3,440,188 | 4/1969 | Burdick et al. | 260/8 |
| 3,728,418 | 4/1973 | Gleason | 260/898 |
| 3,956,174 | 5/1976 | Palcher | 252/400 |
| 3,969,297 | 7/1976 | Teer et al. | 524/745 |
| 4,133,921 | 1/1979 | Palcher | 427/355 |
| 4,358,389 | 11/1982 | Koenig-Lumer et al. | 252/70 |
| 4,636,324 | 1/1987 | Murase et al. | 252/70 |
| 4,744,913 | 5/1988 | Salvador et al. | 252/70 |
| 4,954,279 | 9/1990 | Ma et al. | 252/70 |

FOREIGN PATENT DOCUMENTS 50700  1/1981  European Pat. Off.
257720  8/1987  European Pat. Off.

*Primary Examiner*—Paul R. Michl
*Assistant Examiner*—Tae H. Yoon
*Attorney, Agent, or Firm*—Hubbard, Tucker & Harris

[57] ABSTRACT

A chemical composition is provided for protecting, preserving, restoring and enhancing the appearance of rubber and polymer surfaces of de-icing boots on aircraft, particularly pneumatic de-icers. The chemical composition comprises the main elements of styrene acrylic emulsion polymer, polyethylene emulsion and polyolefin polymer emulsion, all mixed in distilled water. The preferred composition also includes 1,4 butanediol, polymethylsiloxane emulsion, potassium fluoroalkyl carboxylate, 12 benzisohiazolin 1-3, and ethylene glycol. A method of applying the composition to de-icer surfaces.

16 Claims, No Drawings

COMPOSITION AND METHOD FOR PRESERVING AND RESTORING DE-ICER SURFACES

This is a continuation-in-part of copending application Ser. No. 07/711,617, filed Jun. 5, 1991, abandoned.

TECHNICAL FIELD

This invention relates to a polymer preservative and restorer, and in particular to a composition for protecting, preserving, restoring and enhancing flexible surfaces on de-icing apparatus.

BACKGROUND OF THE INVENTION

Most of the general aviation and commuter fleets of the world are fitted with ice protection systems. These systems usually include de-icer apparatus installed to cover various parts, including the wings, propellers and intake ports of the aircraft. The de-icer apparatus typically consist of one or more flexible members affixed to conform to the aerodynamic shape of the covered part of the aircraft. These de-icers are often pneumatic rubber boots having means by which the boots are sequenced through inflation and deflation cycles to crack and remove the ice that becomes attached thereto. Thus, the rubber composition of the boot is highly stressed and worn from continual pneumatic flexing as well as from being exposed to extreme temperatures and harsh environmental conditions.

More specifically, the function of these de-icing boots is to remove ice from the edge of the wing surface. This is accomplished by the de-icing boot cycling through an inflation and deflation process. As the rubber expands and then contracts, the ice breaks off and rids the plane of the excess weight of the ice. However, at low temperatures of at least about 5 degrees Fahrenheit, the ice removal efficiency of the de-icing boot is greatly reduced when compared to the efficiency of the ice removal at higher sub-freezing temperatures.

Consequently, there is a need for a special composition particularly adapted to be applied to flexible surfaces, such as rubber surfaces of de-icing boots, to act as a flexible protective agent and preservative and to restore and maintain flexibility of the rubber, thereby insuring long life. Such a composition must be able to withstand both the extreme environmental conditions to which aircraft are exposed and the high speeds of the aircraft.

In addition, de-icer apparatus is usually installed on the leading edges and front portions of various parts of aircraft so that they are highly visible. Thus, it is important that the boots maintain an attractive appearance despite the continual weathering and harsh conditions to which they are subjected. A composition for treating rubber surfaces is needed which will cosmetically enhance and improve the appearance of the surface as well as to act as a preservative and protectant.

Conventional preservative and protective compositions consisting of styrene acrylic and polyethylene emulsions are well known in the art. For example, U.S. Pat. No. 3,440,188 (Burdick et al) discloses a water base polish containing 70 to 80 percent by weight of an ethylene wax and an unspecified amount of a synthetic resinous polymer consisting of a homopolymer or copolymer styrene, and/or acrylic and methacrylic acid esters. The primary purpose of the composition disclosed in Burdick et al is to provide enhanced characteristics in all of the polish film properties, such as gloss, waterspot resistance, resistance to powdering or dusting, slip resistance, recoatability, removability, buffability, scuff resistance and the like. Another patent that discloses the use of styrenes in conjunction with suitable ethylene based waxes in U.S. Pat. No. 3,728,418 (Gleason). The composition in Gleason provides for a floor polish with a composition of a styrene copolymer emulsion and a styrene multi-polymer emulsion that inhibits the plasticizer in the vinyl floor covering from migrating from the vinyl floor covering into the floor polish.

Other prior art discloses de-icing or anti-icing compositions such as those disclosed in European applications Nos. 50,700 and 257,720 and U.S. Pat. Nos. 4,358,389 (Konig-Lumber et al), 4,636,324 (Murase et al), 4,744,913 (Salvador et al) and 4,954,279 (Ma et al). Most of these compositions contain a high percentage of glycol that reduces the freezing point of the water which melts the ice and thereby eliminating it from the surface to which it is applied. One patent (Murase et al) discloses a composition that contains a large percentage of organopolysiloxane which prevents the formation of ice on the surface to which it is applied. As is the case with the de-icing compositions containing glycol, the organopolysiloxane composition does not have any other protective characteristics and therefore, offers no advantage other than preventing the formation of ice.

SUMMARY OF THE INVENTION

In accordance with the present invention, there is provided a composition and process for the use and application of a superior preservative and protectant that can be applied to a flexible surface such as rubber surfaces that are associated with de-icer apparatus on aircraft. The composition of the present invention is not a de-icing composition, but rather it functions to preserve and protect flexible surfaces such as rubber de-icing apparatus used on aircraft. One of the main features of the composition of the present invention is that it provides a preservative which maintains continued flexibility of the rubber boots of the aircraft over a sustained period of use. This composition also restores and enhances rubber boot surfaces so as to improve the function and capability of de-icing apparatus. The composition of the present invention provides a protectant and preservative for de-icer surfaces against the deleterious effects of high speeds, extreme temperatures, harsh weather conditions, ozone, ultra-violet radiation and other environmental causes of the degradation of the rubber surfaces of de-icer apparatus. This composition also seals and renews rubber surfaces that have been damaged by surface cracking. It also provides a cosmetic treatment of the rubber composition to enhance and improve the appearance of the de-icer surfaces.

The composition of the present invention is comprised of the novel combination of a mixture of a styrene acrylic emulsion, a polyolefin polymer emulsion, and an alcohol in an aqueous carrier liquid. The styrene acrylic emulsion may comprise from about 40% to about 60% by weight of the composition and the polyolefin polymer emulsion may comprise from about 5% to about 9% by weight of the composition. The polyolefin can be selected from the group consisting of polyethylene or polypropylene. The alcohol, which gives the styrene acrylic and polyolefin emulsion the essential degree of flexibility, is selected from the group consisting of dihydric or polyhydric alcohols where they may comprise from about 1% to about 6% by weight of the composition.

In a further aspect of the present invention the composition includes: a polydimethysiloxan emulsion which serves as an anti-foaming agent, leveling agents well known in the art such as the flouroalkyls that are taught in U.S. Pat. No. 2,937,098, and 1,2 benzisothiazolin 3-1 which serves as a preservative for the composition by reducing the bacteria growth.

In a further aspect of the present invention there is provided a simple easy process for applying the composition to the de-icing boot of an aircraft. The composition which is in liquid form is poured directly from the bottle onto an absorbent material such as a piece of cloth. The composition is then applied to the de-icing boot by wiping it directly onto the de-icing boot. Because this procedure can be done very quickly and easily and there are no long periods of drying time required, an application of the composition can be done just prior to take-off.

DETAILED DESCRIPTION OF THE PREFERRED EMBODIMENT

The present invention provides a composition and a process for the use and application of a superior preservative and protectant that can be applied to flexible surfaces. One such application involves the use of the composition on pneumatic de-icing boots of an aircraft. Pneumatic de-icing boots which are generally made of a soft flexible neoprene rubber, are subjected to extreme temperatures, high airspeeds and expansion and contraction by way of pneumatic flexing. In this type of application, it is very important that the boot surfaces be coated with a composition that not only aides in preserving and extending the life of the surface but also one that is flexible so that it will not crack and flake off when the surface is frequently expanded and contracted.

The present composition comprises a mixture of three main components in an aqueous solution, which are: a styrene acrylic emulsion, a polyolefin emulsion, and an alcohol. One of the main ingredients of the present invention is a styrene acrylic emulsion polymer. Both the styrene acrylic and polyolefins emulsions are well known in the art as noted in U.S. Pat. No. 3,969,297 (Teer, et al). The styrene acrylic emulsion acts as the "glue" to the entire compound holding it together. A high percentage is used to make the compound bond strong enough to hold the ingredients together under all conditions. The preferred range of percentage by weight can vary from about 40% to about 60%. Preferably, the styrene acrylic emulsion constitutes about 55% by weight of the composition. A suitable styrene acrylic emulsion, for example, is one which is a high molecular weight transition metal cross-linked acrylic polyethylene or polypropylene polish floor wax that is made by reaction of an acrylate such as an acrylic acid or methyl methacrylate with a styrene in water via a free radical addition mechanism. The product of this reaction is then neutralized with ammonia to a PH of about 7 or 8. An example of a suitable type of styrene acrylic emulsion that is commercially available in CONLEX IV manufactured by Morton.

The styrene resins used in the styrene acrylic emulsion of the present invention are of the type that are well known in the art as discussed in U.S. Pat. No. 3,440,188 (Burdick et al) and are synthetic water-insoluble thermoplastic materials. These styrene resins are composed of organic polymers that have a polymer structure which is predominantly composed of monomer units derived from styrene. These styrene resins may be composed of homopolymers of styrene, or copolymers or styrene with one or more other comonomers which are copolymerizable therewith by conventional polymerization techniques, such as the methacrylic acid, acrylic acid, acrylonitrile, acrylamide, itaconic acid, maleic anhydride, and tethacrylic acid and acrylic acid esters of monohydric alcohols containing from one to eight carbon atoms.

The acrylic resins are also well known in the art, and are synthetic water insoluble thermoplastic vinyl polymeric materials which are composed of monomer units derived from the esters of acrylic and methacrylic acids. Typical esters of such acids are the methacrylic and acrylic acid esters of monohydric alcohols containing from one to eight carbon atoms, such as methyl methacrylate, ethyl methacrylate, butyl methacrylate, hexyl methacrylate, 2-ethyl hexyl methacrylate, methylacrylate, ethyl acrylate, hexyl acrylate, 2-ethyl hexyl acrylate, and the like. These acrylates may be composed of homopolymers of such acid ester monomers, or may be composed of copolymers of one or more of such acid ester monomers with one or more other vinyl unsaturated comonomers which are copolymerizable therewith by conventional emulsion polymerization techniques. Typical of such comonomers for these acrylic resins are styrene, acrylonitrile, acrylamide, itaconic acid, acrylic acid and methacrylic acid.

The polyolefin emulsion comprises from about 5% to about 9% by weight of the composition and more preferably about 7% by weight of the composition. Preferably, the polyolefin is selected from the group consisting of polyethylene or polypropylene. The polyethylene or polypropylene emulsions are interchangeable in the composition and the required total percentage weight of the polyolefin can be made up of either one or a combination of these two if so desired. These polyolefins form a wax emulsion when the polyolefin is heated and mixed with water in the presence of potassium hydroxide or sodium hydroxide. The polyolefin emulsion is a nonionic high density ingredient which provides a hard coating for the rubber surface and also as well adding a certain amount of enhancement to the appearance. Two examples of suitable polyolefins that are commercially available are AC-325 and E-43 both manufactured by Morton.

The third component is an alcohol that gives the styrene acrylic and polyolefin emulsion the essential degree of flexibility. Preferably, alcohol comprises from about 1% to about 6% by weight of the composition, and more preferably from about 3% to about 4% by weight of the composition. The alcohol is selected from a group consisting of dihydric alcohols or polyhydric alcohols. Preferably, the alcohol is an aliphatic dihydric alcohol and more preferably, is selected from the group consisting of ethanediol, propanediol, butanediol, or pentanediol. More than one type of aliphatic dihydric alcohol can be used, provided that the total percentage by weight is kept within the parameters set out above. For example, 2% by weight of the composition could be 1, 4 butanediol and 1% could be ethylene glycol.

Another ingredient includes leveling agents that are well known in the art, such as fluoroalkyls, which are added to enhance viscosity so as to level out the coating to provide a perfectly smooth surface upon application. The percentage by weight of the composition may vary from about 0.3% to about 1.60%, and more preferably about 0.8%. Preferably, the fluroalkyl compound is a potassium fluroalkyl carboxylate, having the general formula: $(C_aX'_{2a+1})fZ$ wherein $a$ is a small number of 6–12, X' is a member of the class consisting of hydrogen and flourine atoms with the groups $C_aX'_{2a+1}$ having at least 55% by weight of flourine atoms, f is a small whole number of 1–8, and Z is a radical such that the compound $(C_aX'_{2a+1})fZ$ is more water soluble than the compound $(C_aX'_{2a+1})fH$.

Other ingredients include: 1,2 benzisothiazolin 3-1 which is a mercury-free antimicrobial that assists in preserving the compound and the rubber surface. It may vary from about 0.02% to 0.14% by weight and polydimethyl-siloxane emulsion which acts as an anti-foaming agent and can vary from 0.02% to 0.05% by weight.

The remaining approximate 34% by weight comprises water. More specifically, the preferred composition of the present invention comprises the following ingredients shown in Table 1. The table includes the generic description of the ingredients, the percent by weight in the composition and a preferred brand name and source. The amount of distilled water to be added depends to some degree upon the aging of the rubber surface. Older aged surfaces sometimes absorb considerably more water than newer surfaces. Normally, the amount of water that should be added without degrading the protective quality of the product is approximately 60% by weight. For newer surfaces, the minimum amount of water to be applied should, normally, be no less than 40% by weight.

TABLE I

| Ingredient | Percent | Source |
|---|---|---|
| distilled water | 34.34 | n/a |
| styrene acrylic emulsion polymer | 55.00 | CONLEX IV/Morton |
| polyethylene emulsion | 3.57 | AC-325/Morton |
| polypropylene polymer emulsion | 3.20 | E-43 Morton |
| 1,4 butanediol | 2.00 | GAF |
| polydimethyl-siloxane emulsion | 0.02 | SAG 1010/Union Carbide |
| potassium fluoroalkyl carboxylate | 0.80 | FLUORAD FC-129/3M |
| 1,2 benzisothiazolin 3-1 | 0.07 | PROXEL GXL/ICI America |
| ethylene glycol | 1.00 | Chemcential |

In order to best preserve and renew rubber de-icing surfaces, a particular method of applying the preservative composition is used. A conventional cleaning surface composition may be first applied to prepare the de-icer for the composition of the present invention. The preservative composition is applied in a single coating to the entire de-icing apparatus which is exposed to the environment, and the coating is allowed 3 to 5 minutes for drying. In the event that the surface is particularly dry or absorbent, it may be necessary to apply more than one coat. Thus, 3 to 5 minutes must be allowed between each application for thorough penetration of the composition into the surface layer of the material. Once the composition has dried, the molecules are thoroughly bonded with the rubber composition so that they will not detach from the de-icer even at high speeds and in harsh conditions. Two or three coats may be initially applied. A single coat is preferably applied after each washing.

EXAMPLES

In testing the composition of the present invention, the preferred mixture described in Table I was applied in the process described above to several de-icing boots made by B. F. Goodrich Aerospace. The testing was conducted at B. F. Goodrich De-icing Systems on a Piper Malibu aircraft. Each of the de-icing boots were processed through inflation sequences in which the upper part of the boot is inflated first and then the lower part is inflated with a variable time interval between, as indicated. The inflation pressure throughout the testing was 18 pounds per square inch. The angle of attack, aircraft speed, temperature and ice thickness were additional factors which were varied to simulate environmental conditions.

Table II lists the parameters used for each test and provides a summary of the percentage of ice removal obtained both with and without use of the composition of the present invention at different variable values. The "*" indicates testing with the composition on the de-icing boots, and "●" indicates testing without the composition on the boots.

It can be seen that at higher temperatures of about 25 degrees Fahrenheit, the composition had at least a slightly noticeable effect on de-icing surface. At lower temperatures the effect of using the composition on the de-icer showed a noticeable improvement. The most dramatic improvement was apparent at low temperatures with relatively heavy thickness of ice on the boot, as shown in Test 8 in which the temperature was five degrees Fahrenheit and the ice was one-half inch thick on the surface of the boot. During this test, without the use of the composition, only 20% of the ice was removed in the first inflation, 30% in the second inflation and 35% in the third inflation. In sharp contrast, by applying a coating of the composition of the present invention, 92% of the ice was removed in each of the three inflations.

As can be seen further from examining the results shown in Table II, all test results (except for one) in which the composition of the present invention was used show at least 75% removal of all ice. In most of the testing, over 90% of the ice was removed. These test results illustrate the effect of the composition of the present invention in restoring and enhancing the rubber surfaces of de-icers.

TABLE II

| Test | De-Icer Description | Inflation Sequence | Angle of Attack (degrees) | Airspeed MPH | Temp °F. | Ice Thickness | */● | Percent Ice Removal | | |
|---|---|---|---|---|---|---|---|---|---|---|
| | | | | | | | | 1st Infl. | 2nd Infl. | 3rd Infl. |
| 1 | Model 41 | 2 minutes | 0 | 180 | +25 | ¼ inch | * | 80 | 85 | 85 |
| | | | | | | | ● | 80 | 85 | 90 |
| 2 | Model 45 | 8 minutes | 0 | 180 | +25 | ¼ inch | * | 96 | 97 | 98 |
| | | | | | | | ● | 90 | 95 | 98 |
| 3 | Model 47 | 2 minutes | +4 | 180 | +25 | ¼ inch | * | 95 | 96 | 96 |
| | | | | | | | ● | 10 | 45 | 55 |
| 4 | Model 50 | 8 minutes | +4 | 180 | +25 | ¼ inch | * | 94 | 96 | 96 |
| | | | | | | | ● | 94 | 95 | 97 |

TABLE II-continued

| Test | De-Icer Description | Inflation Sequence | Angle of Attack (degrees) | Airspeed MPH | Temp °F. | Ice Thickness | Percent Ice Removal | 1st Infl. | 2nd Infl. | 3rd Infl. |
|---|---|---|---|---|---|---|---|---|---|---|
| 5 | Model 54 | 4 minutes | −2 | 180 | +25 | ¼ inch | */● | 93 / 90 | 94 / 92 | 94 / 92 |
| 6 | Model 63 | 5 minutes | 0 | 120 | +25 | ¼ inch | */● | 95 / 60 | 95 / 65 | 98 / 65 |
| 7 | Model 83 | 4 minutes | 0 | 180 | +5 | ¼ inch | */● | 75 / 25 | 80 / 25 | 80 / 70 |
| 8 | Model 85 | 6 minutes | 0 | 180 | +5 | ¼ inch | */● | 92 / 20 | 92 / 30 | 92 / 35 |
| 9 | Model 85 | 4 minutes | 0 | 120 | +5 | ¼ inch | */● | 35 / 5 | 35 | 40 |

The foregoing describes compositions and processes of the present invention for the protection, preservation, restoration and cosmetic enhancement of rubber de-icer boot apparatus, in particular pneumatic de-icers used on aircraft. Use of the present invention results in de-icer apparatus having a protective preservative coating which provides a brilliant long-lasting shine. The coating will not detach from the de-icer composition at normal aircraft speeds and results in a substantial enhancement to the performance, life and appearance of such de-icer apparatus.

Various modifications are contemplated which will be apparent to those skilled in the art and can be applied to the preferred embodiment described above without departing from the spirit and scope of the invention as defined by the following claims.

I claim:

1. A chemical composition of matter comprising: a mixture of styrene acrylic emulsion comprising from about 40% to about 60% by weight of the composition; a polyolefin emulsion comprising from about 5% to about 9% by weight of the composition; and an alcohol comprising from about 1% to about 6% by weight of the composition, said alcohol selected from the group consisting of dihydric and polyhydric alcohols, in an aqueous carrier.

2. The composition of claim 1 further including polydimethylsiloxane emulsion comprising about 0.02% by weight of the composition.

3. The composition of claim 1 further including a flouroalkyl compound having the formula $$(C_aX'_{2a+1})_fZ$$

wherein $a$ is a small number of 6–12, $X'$ is a member of the class consisting of hydrogen and flourine atoms with the groups $C_aX'_{2a+1}$ having at least 55% by weight of flourine atoms, f is a small whole number of 1–8, and Z is a radical such that the compound $(C_aX'_{2a+1})_fZ$ is more water soluble than the compound $(C_aX'_{2a+1})_fH$.

4. The composition of claim 1 further including 1, 2 benzisothiazolin 3-1 comprising about 0.07% by weight of the composition.

5. The composition of claim 1 wherein the alcohol is a dihydric aliphatic alcohol selected from the group consisting of alkanes or alkenes.

6. The composition of claim 1 wherein the alcohol is a polyhydric alcohol.

7. The composition of claim 1 wherein the polyolefin polymer is selected from the group consisting of polyethylene or polypropylene.

8. A chemical composition of matter comprising: a styrene acrylic emulsion comprising about 55% by weight of the composition; a polyolefin polymer emulsion comprising about 7% by weight of the composition; an alcohol selected from the group consisting of dyhydric and polyhydric alcohols, comprising about 3% by weight of the composition; and water comprising about 34% by weight of the composition.

9. The composition of claim 8 wherein the alcohol is a dihydric aliphatic alcohol selected from the group consisting of alkanes or alkenes.

10. The composition of claim 8 wherein the polyolefin polymer emulsion is selected from the group consisting of polyethylene or polypropylene.

11. The composition of claim 8 and further including polydimethylsiloxane emulsion comprising about 0.02% by weight of the composition.

12. The composition of claim 8 and further including 1, 2 benzisothiazoline 3-1 comprising about 0.07% by weight of the composition.

13. The composition of claim 8 and further including a flouroalkyl compound comprising about 0.08% by weight of the composition and having the formula $$(C_aX'_{2a+1})_fZ$$

wherein $a$ is a small number of 6–12, $X'$ is a member of the class consisting of hydrogen and flourine atoms with the groups $C_aX'_{2a+1}$ having at least 55% by weight of flourine atoms, f is a small whole number of 1–8, and Z is a radical such that the compound $(C_aX'_{2a+1})_fZ$ is more water soluble than the compound $(C_aX'_{2a+1})_fH$.

14. A composition for the preservation, restoration and enhancement of rubber and polymer surfaces on de-icing apparatus for aircraft, comprising: a styrene acrylic emulsion comprising about 55% by weight of the composition; a polyethylene emulsion comprising about 3% by weight of the composition; a polpropylene polymer emulsion comprising about 3% by weight of the emulsion; water comprising about 34% by weight of the composition; 1, 4 butanediol comprising about 2% by weight of the total composition; a polydimethylsiloxane emulsion comprising about 0.02% by weight of the composition; a potassium fluoroalkyl carboxylate comprising about 0.08% by weight of the composition; 12 benzisohiazolin 3-1 comprising about 0.07% by weight of the composition; and ethylene glycol comprising about 1% by weight of the composition.

15. A chemical composition for preserving and enhancing rubber surfaces on de-icing apparatus comprising: a styrene acrylic emulsion comprising from about 40% to about 60% by weight of the composition; a polyethylene emulsion comprising from about 2% to about 5% by weight of the composition; a polypropylene polymer emulsion comprising from about 2% to about 5% by weight of the composition; 1, 4 butanediol comprising from about 1% to about 3% by weight of the composition; and water comprising from about 30% to about 50% by weight of the composition.

16. A coated article having a flexible surface and an applied preservative coating, the combination comprising:

(a) a flexible surface formed of an elastomeric material having a surface adapted to be exposed to low temperature environments;

(b) means for causing the flexible surface to undergo movement causing distortion of the surface; and (c) a protective coating formed on said outer surface comprising: a styrene acrylic emulsion comprising from about 40% to about 60% by weight of the composition; a polyolefin polymer emulsion comprising from about 5% to about 9% by weight of the composition; an alcohol comprising from about 1% to about 6% by weight of the composition, said alcohol selected from the group consisting of dihydric and polyhydric alcohols; and water.

* * * * *